Jan. 8, 1963 H. MANDROIAN ETAL 3,072,557
ELECTROLYTIC RECOVERY APPARATUS
Filed Nov. 9, 1959 2 Sheets-Sheet 1

INVENTORS
HAROLD MANDROIAN
HOWARD LEWIN
BY Lilly & Nyhagen
Attorneys

Jan. 8, 1963 H. MANDROIAN ETAL 3,072,557
ELECTROLYTIC RECOVERY APPARATUS
Filed Nov. 9, 1959 2 Sheets-Sheet 2

INVENTORS
HAROLD MANDROIAN
HOWARD LEWIN
BY
Lilly & Nyhagen
Attorneys

United States Patent Office 3,072,557
Patented Jan. 8, 1963

3,072,557
ELECTROLYTIC RECOVERY APPARATUS
Harold Mandroian and Howard Lewin, La Canada, Calif., assignors to R-Gentron, Los Angeles, Calif., a corporation of California
Filed Nov. 9, 1959, Ser. No. 851,702
9 Claims. (Cl. 204—321)

This invention is concerned generally with electrolysis and particularly with an electrolytic apparatus for recovering products from electrolytic solutions.

It is well known in the art to recover products from solutions by an electrolytic process. This well-known process, simply stated, involves immersing a pair of electrodes in an electrolytic solution containing the product to be recovered and impressing across the electrodes a voltage of sufficient magnitude to cause electrolytic decomposition of the desired product. One use of the electrolytic recovery process, for example, is recovering silver from used photographic hypo solutions.

Thus, it is known that during repeated use of a photographic hypo solution, the silver ion concentration in the solution increases and the effectiveness of the solution decreases. It is desirable, therefore, to extract the silver from the hypo solution for two reasons, first, to revitalize or recondition the solution for reuse, and, second, to recover the excess silver content of the solution.

While the voltage which causes the electrolytic recovery process to proceed is impressed across the electrodes, the voltage or potential which governs the process is the potential of the electrodes with respect to the electrolyte. If this electrode potential varies, the quality/or quantity of the recovered product may be adversely affected and products other than the desired product may be electrolytically decomposed. For example, we have found in the electrolytic recovery of silver from hypo solutions that if the potential of the cathode, on which metallic silver plate is formed, with respect to the electrolyte is maintained at approximately 1.2 volts, both the silver recovery rate and quality of the silver plate will be excellent. If the electrode potential changes, both the quality and quantity of the silver plate are adversely affected and the hypo solution may be electrolytically decomposed. The resulting decomposition products are insoluble in and contaminate the solution.

It is well known that during the course of any electrolytic recovery process of this type, the potential of the electrodes with respect to the electrolye is prone to change due to polarization, accumulation of electrolytically decomposed products on the electrodes, and the decrease in the ion concentration of the solution which occurs during the course of the process. Polarization and product accumulation on the electrodes changes the resistance to electrical current conduction between the electrodes and electrolyte, that is, the "surface resistance" of the electrodes. We have determined that the changes which occur in the electrode potentials during an electrolytic recovery process are due primarily to changes in this "surface resistance."

In the existing apparatus for recovering silver from hypo solutions, the voltage applied to the electrodes from the external voltage source is manually adjusted to compensate for changes in the above-listed factors which tend to alter the electrode potentials with respect to the electrolyte and thereby maintain these electrode potentials at the correct level. Generally, the necessary adjustments or voltage settings are obtained from pre-established graphs or tables which list the proper voltage corrections for certain intervals of time. Such a manual method of voltage correction is obviously costly, does not continuously maintain the electrode potential at the correct level, and, in general, is thoroughly impractical.

With the foregoing preliminary discussion in mind, a general object of this invention is to provide an electrolytic apparatus for recovering products from electrolytic solutions, which apparatus avoids the foregoing and other deficiencies of existing electrolytic recovery apparatus.

A more specific object of the invention is to provide an electrolytic recovery apparatus for the purpose described in which the voltage applied to the electrodes is continuously and automatically controlled to maintain the proper potential of the electrodes with respect to the electrolyte for the particular product being recovered.

Another object of the invention is to provide an electrolytic recovery apparatus of the character described in which the potential of one or more of the electrodes of the apparatus with respect to the electrolyte is continuously sensed and the voltage applied to the electrodes is automatically changed in response to any variations in the electrode potential.

Yet another object of the invention is to provide an electrolytic recovery apparatus of the character described which is ideally suited to the electrolytic recovery of silver from hypo solutions.

An object of the invention closely related to the foregoing object is to provide an electrolytic silver recovery apparatus for the purpose mentioned in which the potential of the electrodes with respect to the electrolyte is so accurately maintained at the optimum level as to produce an extremely high silver recovery rate and a silver plate of excellent quality.

A further object of the invention is to provide an electrolytic recovery apparatus of the character described having various unique features of construction and design which especially adapt the apparatus to its intended use.

Yet a further object of the invention is to provide an electrolytic recovery apparatus of the character described which is relatively simple in construction, compact in size, lightweight, economical to manufacture, and otherwise ideally suited to its intended purposes.

Other objects, advantages and features of the invention will become apparent as the description proceeds.

The invention may be best understood from the following detailed description thereof taken in connection with the attached drawings, wherein.

Figure 1:
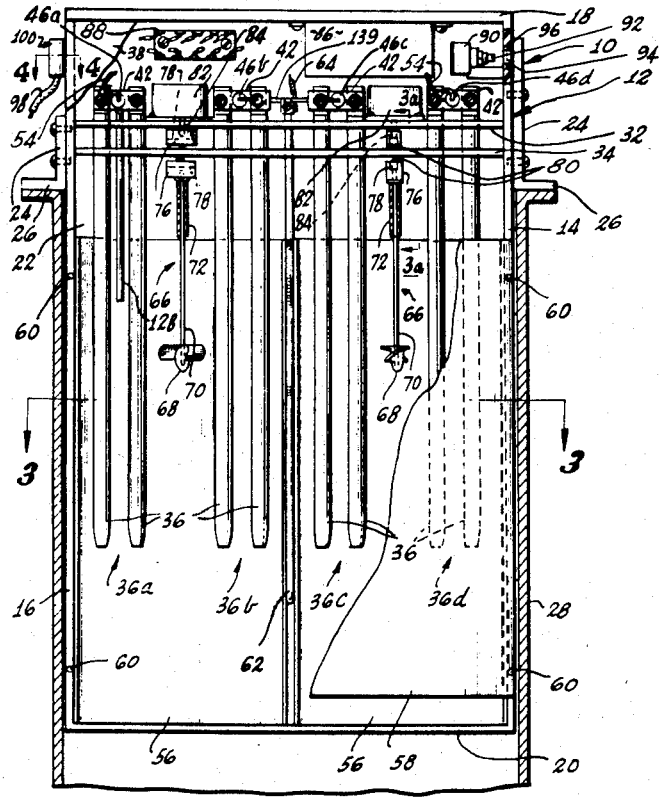
FIG. 1 is a side elevation, partially broken away, of one form of the present electrolytic recovery apparatus in operative position in an electrolyte tank.

In these drawings, the electrolytic recovery apparatus is generally denoted by the numeral 10. The apparatus is equipped with a housing 12 constructed of a material, such as a suitable plastic material, which is electrically nonconductive and immune to corrosion by the electrolytic solution with which the apparatus is to be used, such as photographic hypo solution. Housing 12 has a generally flat, rectangular configuration and comprises parallel side walls 14 and 16, top and bottom walls 18 and 20, respectively, and a back wall 22. The back wall closes the entire rear side of the housing. Most of the front side of the housing is left open, as shown.

Fixed to the side walls 14 and 16 adjacent their upper ends are a pair of brackets 24 having lower, horizontal flanges 26. When the apparatus is being used, it is placed in a tank 28 containing a hypo solution 30 and is supported by the flanges 26 which rest on the upper edges of the tank walls 28. In this position of use, the housing 12 is vertically disposed.

Extending horizontally across the inside of the housing, adjacent its upper end, are a pair of partitions 32 and 34. Extending through and supported by these partitions are a series of carbon or graphite electrodes 36. As will presently be seen, these electrodes form the anodes of the electrolytic apparatus. The interior space of the housing 12, between the lower partition 34 and the upper housing wall 18, is made liquid tight by means of a front housing wall 38 which closes the front side of this space. Also, the electrodes 36 are cemented or otherwise sealed to the lower partition 34, as indicated at 40, so that no liquid can leak past the electrodes into the upper housing space.

The electrodes 36 are arranged in pairs, as shown. The pairs of electrodes are designated as 36a, 36b 36c and 36d, respectively. Each pair of electrodes is electrically joined by means of a metal strap 42, which is attached to its respective electrodes by screws 44.

Figure 7:
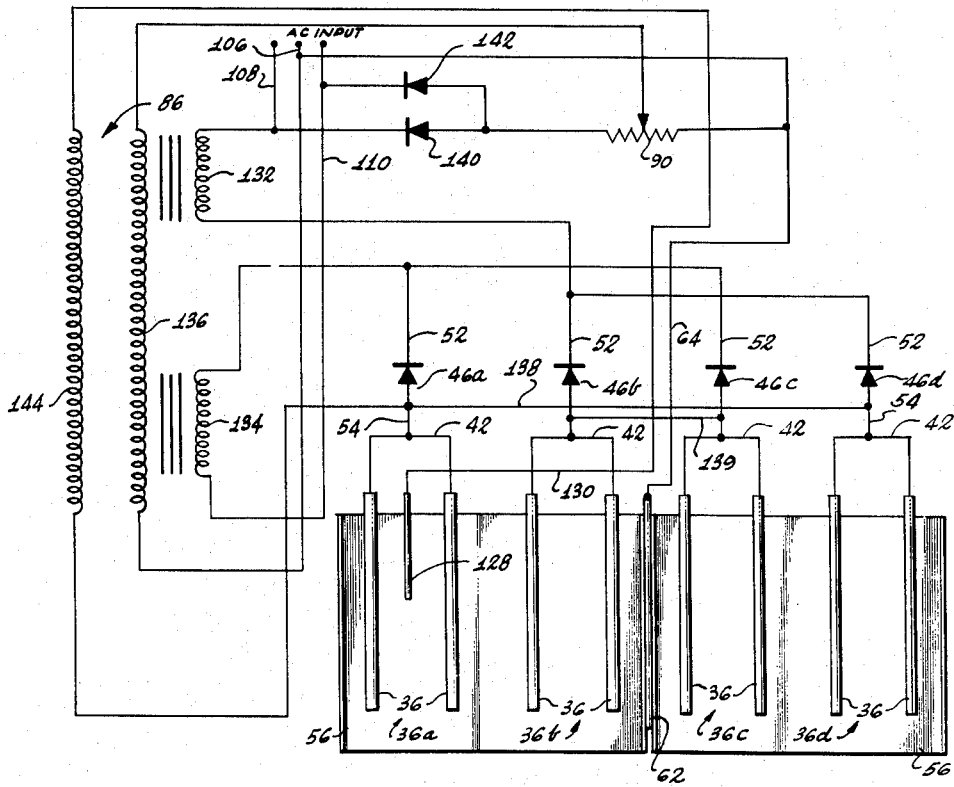
FIG. 7 is a schematic electrical diagram of the apparatus.

A D.C. voltage is applied to the electrodes 36 by means of the electrical circuit illustrated in FIG. 7 and to be presently described. This electrical circuit employs a series of diodes 46a–46d for rectifying the A.C. voltage to produce a D.C. voltage. The diodes are inserted through holes in the centers of the electrode straps 42. Each diode is then fixedly secured to its respective strap by friction or a suitable adhesive or plotting compound 48. A lead 50 electrically connects one terminal of each diode with its respective metal supporting strap 42. Leads 52 and 54 are attached, respectively, to the other terminals of the diodes 46a–46d and the straps 42 for connection of these elements in the electrical circuit of FIG. 7, as will presently be discussed.

The other electrodes, or cathodes of the illustrated apparatus, are three in number and formed by a pair of thin metal plates 56 which are bent into channel shape to have a relatively close but removable fit within the lower part of the housing 12 and a flat front plate 58 which is removably attached to the side walls of the housing by means of screws 60. The front plate 58 contacts the forwardly facing edges of the rear, channel-shaped plates 56 so that the three cathode-forming plates are in electrical contact.

Figure 2:
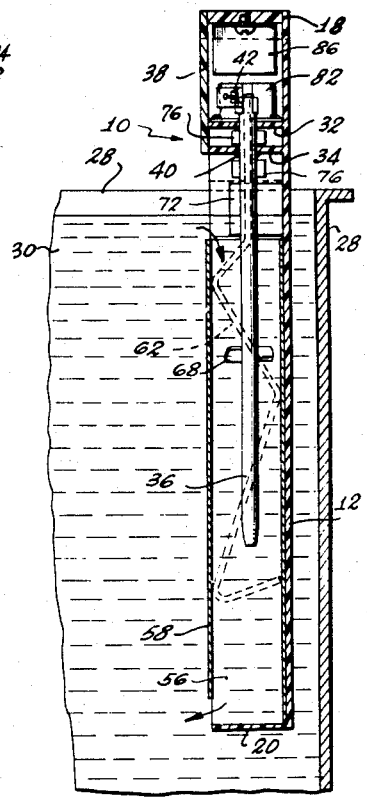
FIG. 2 is a vertical section through the apparatus looking in a direction at right angles to FIG. 1.
Figure 3:
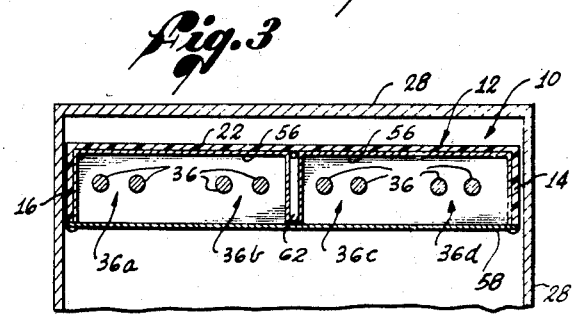
FIG. 3 is a section taken along line 3—3 of FIG. 1.

Frictionally fitting between the two inner, forwardly extending flanges of the rear channel-shaped plates 56 is an electrical contact 62 which is bent into the irregular configuration seen most clearly in FIG. 2 so as to have substantial surface contact with the plates 56. The upper end of this contact extends through and is sealed to the two housing partitions 32 and 34. Attached to the upper end of contact 62 is a wire 64 by which the contact is connected in the electrical circuit of FIG. 7, as will be discussed shortly.

It is obvious from this description of the plates 56 and 58 that they form, in effect, a pair of hollow electrodes or cathodes which encircle the lower ends of the anodes 36. As may be best observed in FIG. 2, spaces exist at the upper and lower ends of the front cathode plate 58 through which electrolytic solution or hpyo solution 30 may circulate into and from the interior spaces of these hollow cathodes. During operation of the apparatus, the silver ions in the solution are deposited, as a silver plate, on the surfaces of the cathode plates 56 and 58. Contrary to normal reasoning, the solution is made more dense by extraction of the silver ions. As a result, there is a natural tendency for the solution to enter the interior cathode spaces through their upper ends and discharge through their lower ends, as indicated by the arrows in FIG. 2. This tendency, of course, produces a natural flow of solution through the apparatus.

Indicated at 66 are a pair of agitating means for aiding this natural flow and thereby increasing the rate of flow of solution through the apparatus. These agitators are identical and comprise propellers 68 fixed on the lower ends of vertical, rotary shafts 70. Shafts 70 are rotatably supported by bearing plates 72 fixed to the rear wall 22 of the housing 12. The bearing plates terminate a distance below the lower housing partition 34. Fixed on the upper ends of the propeller shafts 70 in the space between the bearing plates 72 and the lower partition 34 are blocks 76 containing permanent magnets 78. The upper faces of the blocks 76 have conical points 80 which engage the under face of the partition 34 to form thrust bearings. Mounted on the upper side of the upper partition 32 are a pair of motors 82 having shafts 84 which extend rotatably through the upper partition 32 in axial alignment with the propeller shafts 70, respectively. Fixed on the lower ends of these motor shafts are a second pair of blocks 76 containing magnets 78 identical to those on the rotor shafts 70. The upper blocks 76 may also have lower conical bearing points 80 which engage the upper face of the partition 34 to form thrust bearings.

Each pair of adjacent, opposing magnets 78 form, in effect, a magnetic coupling between the adjacent motor shaft and propeller shaft by which the propellers 68 can be driven by their respective motors. The illustrated magnetic coupling means obviously avoid the necessity of providing rotary fluid seals which would be required if the propeller shafts were directly coupled to their respective motors.

Also housed within the upper liquid-tight space in the housing, above the upper partition 32, is a high gain amplifier 86, a terminal block 88, by which the various electrical elements of the apparatus are electrically connected in the circuit of FIG. 7, and an adjustable resistance device 90 which is for the purpose to be presently discussed. This resistance device has an adjustable stem 92 which may be turned to adjust the effective resistance of the device. The stem has a slot for receiving a screw driver inserted through an opening 94 in the righthand housing wall 14. This hole is normally sealed by engagement of the bracket plate 24 with an O-ring 96 which encircles the hole.

Figure 4:
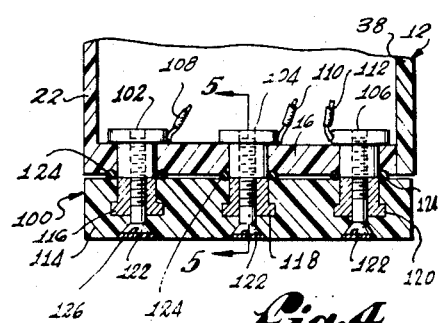
FIG. 4 is an enlarged section taken along line 4—4 of FIG. 1.
Figure 3A:
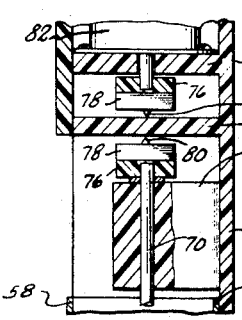
FIG. 3a is an enlarged section taken along line 3a—3a of FIG. 1.
Figure 5:
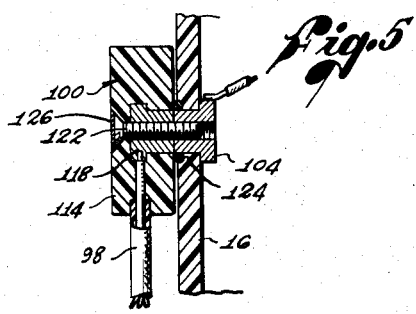
FIG. 5 is a section taken along line 5—5 of FIG. 4.
Figure 6:
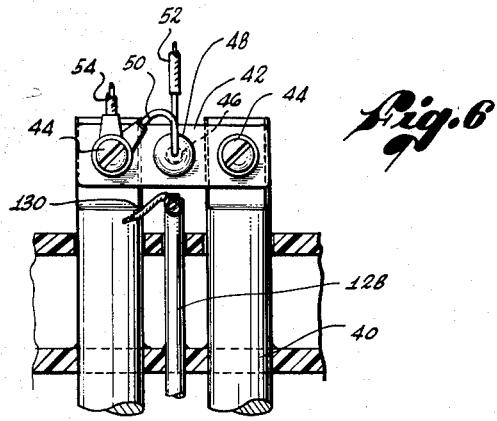
FIG. 6 is an enlargement of the upper end of the left-hand electrodes in FIG. 1.

Electrical power for operating the apparatus is received through a cable 98 extending to a connector 100 on the upper end of the left-hand housing wall 16. This connector, shown most clearly in FIGS. 4 and 5, comprises a series of three contact bushings 102, 104 and 106 which are fitted in holes in the housing wall 16. Wires 108, 110 and 112 extend from these bushings, respectively, for connection of the latter in the circuit of FIG. 7. The connector 100 is completed by an outer detachable part or plate 114 in which are tightly fitted a second group of bushings 116, 118 and 120. When the detachable connector part 100 is mounted on the housing, as it is in FIG. 4, the bushings on the housings are axially aligned, respectively, with and have their end faces engaging the end faces of the bushings on the removable connector part 114, as shown. Part 114 is held in this position by means of screws 122 which extend through axial openings in the bushings on part 114 and are threaded in axial holes in the bushings on the housing. Leakage of liquid past the housing bushings is prevented by O-rings 124 placed as shown. Also, the outer ends of the countersunk screw head holes in the part 114 are sealed with a suitable compound 126 which can be removed when it is found necessary to disconnect the part 114.

As preliminarily mentioned, a primary feature of the invention resides in the means embodied in the apparatus for automatically controlling the electrode potential. This is accomplished by a control or sensing electrode 128 located between the two left-hand anodes 36. The upper end of this sensing electrode extends through and is sealed to the housing partitions 32 and 34 in much the same manner as the anodes. A wire 130 is attached to the upper end of this sensing electrode for connection of the latter in the circuit of FIG. 7, as will now be described.

In this figure, amplifier 86 is shown as a magnetic amplifier having gate windings 132 and 134 and a control winding 136. One end of the control winding 136 connects to the input lead 106 and the other end of this winding connects to the input leads 108 and 110 through a pair of diodes 140 and 142, respectively (not shown in FIG. 1), and the variable resistor 90 which is used to set the amplifier bias.

Leads 52 from the diodes 46a and 46c are connected to the inner end of the gate winding 134. Leads 52 from diodes 46b and 46d are connected to the inner end of gate winding 132. A lead 138 connects the straps 42 on electrode pairs 36a and 36d and a lead 139 connects the straps 42 on electrode pairs 36b and 36c. The cathode terminal lead 64 is tied to the input lead 106.

The three input leads 106, 108 and 110 provide a floating ground energizing circuit for the electrodes 36, 56 in which lead 106 provides the neutral or floating ground connection and are energized in such a way that lead 108 is positive with respect to the ground lead 106 during one-half of each cycle and lead 110 is positive with respect to the ground lead during the other half of each cycle. When these leads are energized, a rectifier A.C. voltage is obviously impressed across the electrodes 36 and 56 which causes the electrolytic process to proceed and the silver ions in the solution 30 to plate out on the cathode 56.

The magnetic amplifier has a feed-back winding 144 which is connected in a control circuit across the sensing electrode 128 and the adjacent anodes 36. During operation of the apparatus, changes in the factors mentioned earlier which tend to alter the electrode potentials produce a change in the resistance to electrical conduction between the sensing electrode and adjacent anode which, in turn, causes a small change in the current flow through the feed-back winding 144. This change in feedback current flow provides a feed-back signal that alters the current flow in the control winding 136 in such a way as to correct the voltage impressed across the electrodes to maintain the potential of the electrodes with respect to the electrolyte relatively constantly. Owing to the proximity of the sensing electrode to the adjacent anode, the feed-back circuit possesses maximum sensitivity to the primary cause of electrode potential change, namely, change in the anode "surface resistance."

In the illustrative apparatus, only one sensing electrode adjacent the anode is used. This is because electrode potential changes are magnified at the anode due to its small surface area with respect to the cathode. Accordingly, in cases where the anode and cathode have about the same surface area, the sensing electrode may be placed adjacent either the anode or cathode, or two sensing electrodes may be used, one adjacent each the anode and cathode. If the cathode has the smaller area, of course, the sensing electrode would be placed near it.

The advantage of employing a "floating ground" energizing circuit for the apparatus is to prevent plating out on the tank walls 28 as would occur if the electrode energizing circuit were grounded to earth. Plating out on the tank walls is also avoided by the semi-enclosed construction of the apparatus housing 12 which minimizes stray currents in the solution 30.

Periodically, silver, or other recovered product, is extracted from the apparatus by removal of the cathode plates.

Mounting the diodes 46a–46d on the electrode straps 42 offers the distinct advantage that the straps, their electrodes, and the electrolytic solution in which the electrodes are immersed form heat sinks for cooling the diodes. This prevents damage to the diodes due to overheating and increases their life and current capacity.

While in the foregoing specification we have described particularly the use of a D.C. voltage, it should be understood that any predominantly unidirectional alternating voltage form may, as well, be used. That is to say, any alternating voltage form may be used which gives rise to a current flow between the electrodes that is preponderantly in one direction, i.e., has a net or resultant unidirectional component, as is obviously essential to the electrolytic action.

It is clear, therefore, that an electrolytic apparatus has been described and illustrated which is fully capable of attaining the objects and advantages preliminarily set forth.

What is claimed is:

1. Electrolytic apparatus for electrolytically recovering a product from an electrolytic solution, comprising a pair of primary electrodes, means including an amplifier having its output connected to the electrodes for impressing a unidirectional voltage across said primary electrodes, a control electrode, an external control circuit connecting one primary electrode and said control electrode including an external potential source for impressing an alternating voltage across said one primary electrode and said control electrode whereby an alternating current flows in said circuit when the electrodes are immersed in the solution, and said amplifier including feedback means for altering the output voltage of the amplifier in response to changes in the alternating current flow in said control circuit in such a way as to maintain the potential of one primary electrode with respect to the solution substantially constant at a predetermined level.

2. Electrolytic apparatus for electrolytically recovering a product from an electrolytic solution, comprising a pair of primary electrodes and a control electrode, means including a magnetic amplifier having its output connected to said primary electrodes for impressing a unidirectional voltage across the primary electrodes, said amplifier including a feedback winding connected between one primary electrode and said control electrode for impressing an alternating voltage across said one primary electrode and said control electrode whereby an alternating current flows through said feedback winding when the electrodes are immersed in the solution, and said amplifier further including a control winding inductively coupled to said feedback winding to alter the voltage impressed across the primary electrodes by the magnetic amplifier in response to changes in the current flow through said feedback winding in such a way as to maintain the potential of one primary electrode with respect to the solution substantially constant at a predetermined level.

3. The apparatus of claim 2 wherein said primary electrodes comprise an anode and a cathode, the surface area of said anode being appreciably less than the surface area of said cathode, said feedback winding connecting said anode and said control electrode and being operative to maintain the potential of the cathode with respect to the solution at said substantially constant level.

4. Electrolytic apparatus for recovering a product from an electrolytic solution contained within a tank, comprising a supporting structure, means including a first electrode on the supporting structure defining a normally vertical, open ended cavity, means on said structure for supporting the latter in a fixed position within the tank wherein the open ends of the cavity are below the surface of the solution, agitator means on the supporting structure to induce a flow of electrolytic solution in one direction through said cavity, a second electrode on the supporting structure extending axially through said cavity, and means to apply a voltage between said electrodes to cause said product to be electrolytically deposited on one electrode.

5. Electrolytic apparatus for recovering a product from an electrolytic solution contained within a tank, comprising a supporting structure, means including a first electrode on the supporting structure defining a normally vertical, open ended cavity, means on said structure for supporting the latter in a fixed position within the tank wherein the open ends of the cavity are below the surface of the solution, agitator means on the supporting structure to induce a flow of electrolytic solution in the downward direction through said cavity, a second electrode on the supporting structure extending axially through said cavity, and means to apply a voltage between said electrodes to cause said product to be electrolytically deposited on one electrode.

6. Electrolytic apparatus for recovering a product from an electrolytic solution contained within a tank, comprising a hollow case of electrical insulating material, means on said case for supporting the latter on the tank with the lower end of the case immersed in the electrolytic solution, said case having a normally vertical open side, normally vertical metal plates extending about the inside of the case to form a hollow electrode defining a normally vertical cavity having open ends, one of said plates partially closing said open side of the case so as to leave upper and lower openings through which the solution can circulate through said cavity, means removably attaching said plates to the case, a second electrode on the case extending axially through said cavity, and means on the case electrically connected to said electrodes to apply a voltage across the electrodes.

7. The subject matter of claim 6 including agitator means to induce circulation of solution in one direction through said cavity, and a motor on the case to drive the agitator means.

8. Electrolytic apparatus for recovering a product from an electrolytic solution contained within a tank, comprising a flat, hollow case of electrical insulating material having a normally lower end which is open at one side, means on said case for supporting the latter on the tank with the lower end of the case immersed in the electrolytic solution, a metal plate overlying the open side of the case so as to partially close the latter and spaced from the upper and lower end walls of the case to define upper and lower side openings through which solution can circulate through the case, additional vertical metal plates within the case electrically connected to the first-mentioned plate and defining with the latter a hollow primary electrode having a vertical cavity open at its ends through which electrolytic solution can circulate, a second primary electrode in the case extending axially through said cavity, means to impress a voltage across said electrodes, a sensing electrode in the case extending axially through means for impressing a voltage across the one primary electrode and said sensing electrode including an external means for impressing a voltage across the one primary electrode and sensing electrode whereby a current flows in said circuit when the electrodes are immersed in the solution, there being changes in the resistance to current flow between the electrodes and electrolytic solution during electrolytic recovery operation of the apparatus which tend to produce corresponding changes in the current flow in said circuit and in the potential of the primary electrodes with respect to the electrolytic solution, and means responsive to the current flow in said circuit for regulating the voltage impressed across the primary electrodes by said first-mentioned means in response to changes in the last-mentioned current flow in such a way as to maintain the potential of the primary electrodes with respect to the solution approximately constant at a predetermined level.

9. In an electrolytic apparatus, a pair of electrodes to be immersed in an electrolytic solution, means including a diode for applying a unidirectional voltage across said electrodes, and means mounting said diode on one electrode in heat transfer relationship thereto so that heat generated in the diode is dissipated by flow through the one electrode to the electrolytic solution.

References Cited in the file of this patent

UNITED STATES PATENTS

| | | |
|---|---|---|
| 1,567,791 | Duhme | Dec. 29, 1925 |
| 1,876,830 | Balassa | Sept. 13, 1932 |
| 2,584,816 | Sands | Feb. 5, 1952 |
| 2,759,887 | Miles | Aug. 21, 1956 |
| 2,832,046 | Reznek | Apr. 22, 1958 |
| 2,832,734 | Eckfeldt | Apr. 29, 1958 |
| 2,835,631 | Metcalf et al. | May 20, 1958 |
| 2,886,496 | Eckfeldt | May 12, 1959 |
| 2,918,420 | Sabins | Dec. 22, 1959 |
| 2,928,782 | Leisey | Mar. 15, 1960 |
| 2,986,512 | Sabins | May 30, 1961 |

FOREIGN PATENTS

| | | |
|---|---|---|
| 644,651 | Germany | Apr. 15, 1937 |